Jan. 2, 1923.

S. R. LITTLEJOHN.
FASTENING FOR WEARING APPAREL AND THE LIKE.
FILED MAY 20, 1922.

1,440,688

Inventor
S. R. Littlejohn
by
W. E. Evans
Attorney

Patented Jan. 2, 1923.

1,440,688

UNITED STATES PATENT OFFICE.

SIDNEY ROBERT LITTLEJOHN, OF NEW MALDEN, ENGLAND.

FASTENING FOR WEARING APPAREL AND THE LIKE.

Application filed May 20, 1922. Serial No. 562,429.

*To all whom it may concern:*

Be it known that I, SIDNEY ROBERT LITTLEJOHN, a subject of the King of Great Britain and Ireland, residing at 73 Chestnut Grove, New Malden, Surrey, England, have invented certain new and useful Improvements Relating to Fastenings for Wearing Apparel and the like, of which the following is a specification.

This invention relates to fastenings for wearing apparel and the like in which so-called press-button fasteners and similar fasteners comprising plug or stud parts and socket parts are adapted for securing together several thicknesses of flexible material, such as leather and fabrics. For this purpose it is usual for either the plug or stud part or the socket part of the fastener to be extended in length so that such part may pierce or pass through holes in the intermediate thickness or thicknesses of material while still being adapted to engage in the usual manner with the complementary part of the fastener. The use of the fasteners in this manner is open to the disadvantage that the intermediate material is insufficiently supported against the stress put upon it at the fastener and wears rapidly at the holes.

The invention has for its object an improvement in the form of such fasteners as well as an improvement in the manner of their use.

According to the invention an eyelet or like fitting is provided upon the intermediate thickness of material for each fastener and the respective parts of the fastener are so provided that either the plug or stud part or the socket part carried by the outer thicknesses of material may serve to receive or engage the said eyelet or like fitting when the fastener is closed, the eyelet or like fitting being retained firmly in position between the plug or stud part and the socket part.

The invention is illustrated in the accompanying drawings in which—

Figure 1 is an enlarged section of the respective parts closed, while

Figure 1:
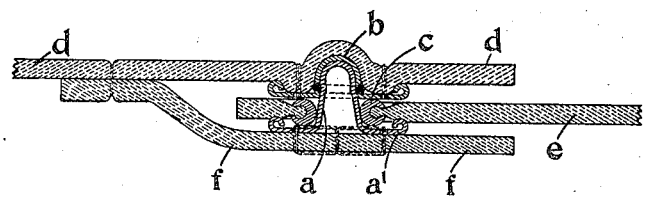
Figure 2:
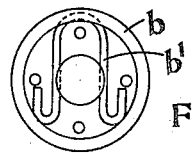
Figure 2 is an enlarged under plan of the socket part illustrated in Figure 1.

According to the invention the plug or stud part $a$ of such fasteners is so provided in relation to the socket part $b$ as to admit of the insertion between them in their fastened or closed position of eyelets $c$ or like fittings carried upon some part separate from that to which the respective parts $a$ and $b$ of the press button fasteners proper are connected, so that thus when it is desired to connect two parts such as $d$ and $e$ of leather, fabric or other material together, one part $e$ may be provided with an eyelet or like fitting or a series of such eyelets or like fittings adapted respectively to be applied upon the stud or plug part $a$ of the press button fasteners, provided upon a piece of leather, fabric or other material $f$ secured by sewing or by other means to the leather, fabric or other material $d$ to which the socket parts $b$ of the fasteners are secured, the socket parts $b$ being set in such positions that on the separate piece of leather, fabric or other material $e$ being brought in position to lie upon the leather, fabric or other material $f$ to which the stud or plug parts $a$ of the fasteners are applied, the socket parts $b$ are disposed immediately over the corresponding stud or plug parts $a$ and thus the series of press button fasteners engage between them the separate part of leather, fabric or other material $e$ on which the eyelets $c$ are provided, and thus the two parts $d$ and $e$ to be connected are secured together in an effective way, and an effective water and wind proof connection is made.

The invention comprises the features which are hereinafter described.

The stud or plug part $a$ of the fastener according to the invention may advantageously be provided of a greater height than usual, and that part of the stud or plug integral with the plate $a^1$ by means of which the part of the fastener is secured to the leather, fabric or other material $f$, is provided of a slightly greater diameter and the upper part is adapted to the form of the socket $b$, and so that the lower part of the plug or fastener $a$ may serve as a stop to determine the position of the one part of the fastener in relation to the other. Or again the socket part $b$ of the press button fastener may itself be provided with a rim on which the eyelet or like fitting provided on the separate part of the material may be applied and for this purpose the eyelet or like fitting referred to may be adapted to be engaged in position in the usual manner of press button fasteners, that is to say the socket part of the press button fastener may itself form a hollow plug part for the reception of the eyelet $c$ or like fitting referred to. The plug or stud part $a$ of the press fastener is preferably so provided with an annular groove for the reception of the spring $b^1$ held within the lower part of the socket part $b$ with its parallel parts protruding through holes so as to engage in the annular groove referred to on the socket part being applied upon the stud part $a$, as is usual in press button fasteners; or the plug or stud part may be so formed that the eyelet $c$ provided upon the separate part of the leather, fabric or other material, may engage in the usual manner of a press button fastener. In this way the respective parts to be connected up may be positively engaged together without possibility of displacement before the two main parts of the press button fastener connected to the same part are closed.

The invention is not limited to the particular form of the fittings used. The socket part may for example be provided tubular in form and the stud part may also if desired be made of a tubular form, and any construction employed so long as the respective main parts of the fasteners used are adapted for the reception between them of the fittings such as $c$ provided upon the other part of the leather, fabric or other material that is to be held by means of the fasteners, while furthermore the eyelets $c$ may be replaced by any like fittings to engage between the respective main parts of the press button fasteners in the manner described.

It will be understood that instead of providing the fasteners upon material such as fabric, they may be applied upon metal or metal plates or upon plates of any other material. Or again any desired material may be used for securing any parts of the respective fasteners, or of the eyelets or like fittings used.

I claim:

1. A stud and socket fastener, comprising a stud part, means upon the said stud part for its attachment to a thickness of material, a socket part separate from the stud part and adapted for engagement therewith, means upon the said socket part for its attachment to a second thickness of material, and an intermediate eyelet fitting adapted to fit between and to be firmly retained by the stud and socket parts, the said intermediate eyelet fitting being mounted in a third thickness of material.

2. A stud and socket fastener, comprising a stud part, means upon the said stud part for its attachment to a thickness of material, a socket part separate from the stud part and adapted for engagement therewith, means upon the said socket part for its attachment to a second thickness of material, and an intermediate eyelet fitting adapted to be positively engaged by the stud part and to be retained firmly between the stud and socket parts, the said intermediate eyelet fitting being mounted in a third thickness of material.

3. A stud and socket fastener, comprising a stud part, means upon the said stud part for its attachment to a thickness of material, a socket part separate from the stud part and adapted for engagement therewith, means upon the said socket part for its attachment to a second thickness of material, and an intermediate eyelet fitting adapted to be positively engaged by the socket part and to be retained firmly between the stud and socket parts, the said intermediate eyelet fitting being mounted in a third thickness of material.

4. In stud and socket fastenings for connecting together a plurality of thicknesses of material, a stud part carrying upon an outer thickness of material, a socket part separate from the said stud part and adapted for engagement therewith, the said socket part being carried by an outer thickness of material, and eyelet fittings respectively mounted in the intermediate thicknesses of material, which eyelet fittings are adapted to be received between and be firmly retained by the inter-engaging stud and socket parts.

SIDNEY ROBERT LITTLEJOHN.